July 16, 1968 P. E. BUSSE 3,393,267
CONNECTOR FOR JACKETED STRIP-WOUND METAL HOSE
Filed Nov. 18, 1966
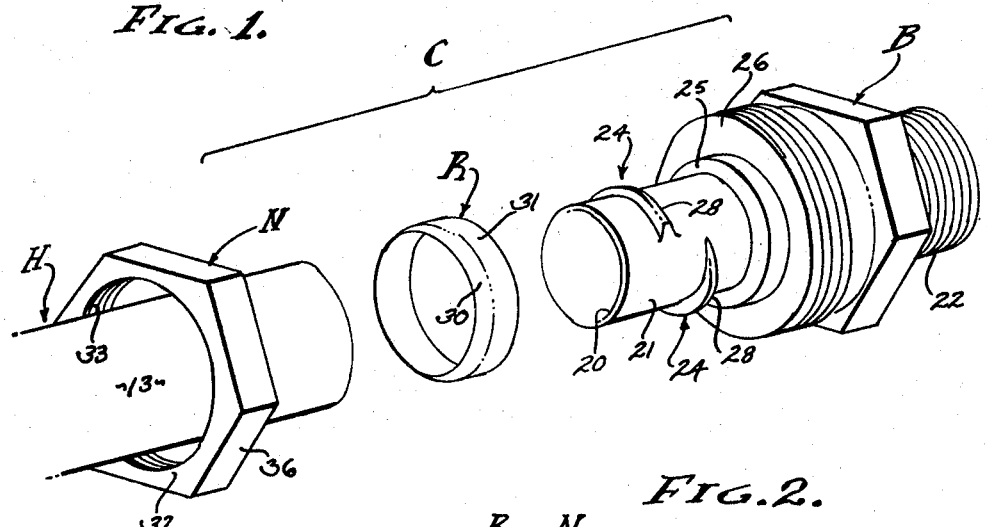
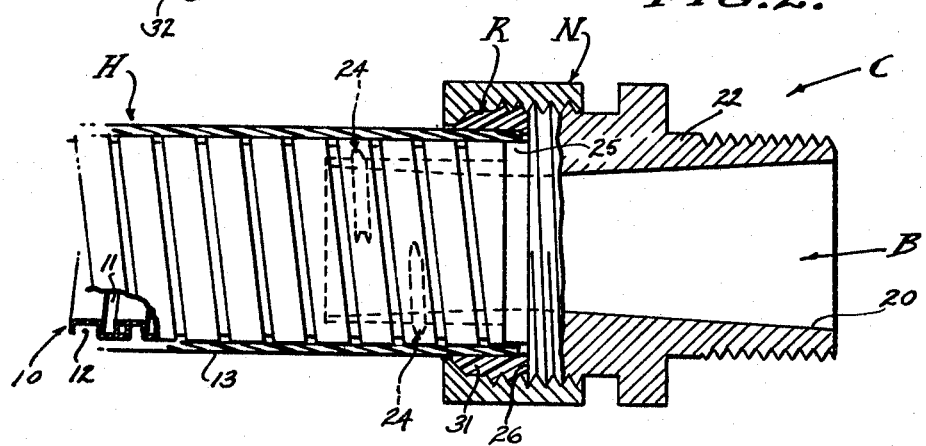
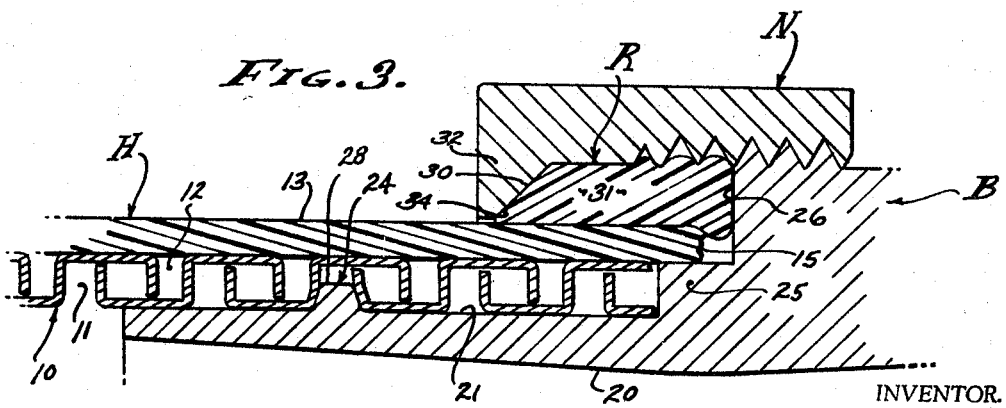
INVENTOR.
PHILIP E. BUSSE
BY
AGENT

United States Patent Office

3,393,267
Patented July 16, 1968

3,393,267
CONNECTOR FOR JACKETED STRIP-WOUND METAL HOSE
Philip E. Busse, Van Nuys, Calif., assignor to Liqua-Tite Corporation, Arcadia, Calif., a corporation of California
Continuation-in-part of application Ser. No. 443,269, Mar. 29, 1965. This application Nov 18, 1966, Ser. No. 595,432
7 Claims. (Cl. 174—78)

ABSTRACT OF THE DISCLOSURE

The subject connector provides an electrically conductive fitting for coupled engagement onto the cut-off end of a convoluted metallic hose from which an impervious outer jacket of insulation has been stripped back. The said hose is especially a conduit for electrical wiring, and objectively the installation of the instant connector is virtually water tight with said impervious jacket and is in electrical continuity with said convoluted metallic hose.

---

This application is a continuation-in-part of application Ser. No. 443,269, filed Mar. 29, 1965 and now abandoned.

This invention relates to a connector for jacketed strip-wound metal hose and is particularly concerned with a connector applicable to the cut off end of such a hose, to seal therewith, to establish a reliable ground therewith, and to furnish a positive mechanical connection therewith.

The hose to which this invention relates is peculiarly characteristic of and comprises a jacketed strip-wound flexible metal tube having axially interlocking helical convolutions in which each convolution is movable relative to adjoining convolutions axially of the hose and between interlocking limits, and a seamless jacket of plastic material fitting snugly about the outer surface of said tube but free from the metal convolutions. Such a metal hose is flexible, watertight and durable from a mechanical viewpoint in that the diameter thereof is reinforced, so to speak. Therefore, such a hose is useful for the housing of electrical conductors in situations which require flexibility, fluid tightness, and mechanical durability.

With the jacketed hose, as above described in general, problems arise in adequacy of connection. That is, the jacketed hose must necessarily be cut to useable lengths and the end portions thereof joined to junction boxes and equipment to be electrified, without loss of fluid tightness, without loss of an electrically continuous ground, and without the loss of mechanical strength especially at the ends of the hose. Further, simplicity is a paramount requirement, both from a cost standpoint and from a use standpoint by persons constructing an installation with the same. Therefore, it is an object of this invention to provide a connector meeting the above set forth requirements and which is simple as well as practical.

It is an object of this invention to provide an electrically conductive fitting wherein a convoluted metallic hose that is jacketed with an impervious electrical insulating material can be properly grounded without stripping of the said jacket from the end portion of the hose.

Another object of this invention is to provide a fluid tight end fitting wherein a convoluted metallic hose that is jacketed with an impervious plastic material can be sealed in a positive and reliable manner.

It is another object of this invention to provide an end fitting of the character thus far referred to and which is mechanically strong and securely installed upon tightening of a single part which is obviously provided for that purpose.

The various objects and features of this invention will be fully understood from the following detailed description of the typical preferred form and application thereof, throughout which description reference is made to the accompanying drawings, in which:

FIG. 1 is an exploded view showing the connector of the present invention as it is related to the jacketed strip wound metal hose.

FIG. 2 is an enlarged detailed sectional view showing the connector installed on the hose, and FIG. 3 is a detailed section showing the construction of the seal ring that characterizes the invention.

In the drawings, I have shown a typical jacketed hose H that is strip-wound of metal and which is covered with a tightly fitted impervious insulating jacket. The hose H comprises a single metal strip 10 having adjacent inwardly and outwardly faced channels 11 and 12 which are convolutely overlapped and engaged respectively, as shown. The hose H also comprises a single seamless jacket 13 of impervious plastic electrical insulation material that is fitted tightly onto the exterior of the hose H. The strip 10 is convolutely wrapped and the overlapped channels 11 and 12 are interlocked so as to permit axial freedom of movement between the adjacent convolutions. Thus, the interlocking strip 10 and plastic jacket 13 combine to present a flexible hose H that is itself watertight and that has a continuous electrically conductive strip 10 for carrying a ground.

The connector C is an end fitting for the hose H hereinabove described and comprises, generally, a body B, a seal ring R and a nut N. The hose H is, of course, round in cross-section and accordingly the connector C is a round or tubular construction disposed on a central axis of the hose H. The connector C is an end fitting and in accordance with the invention the hose H is simply cut off in a plane normal to the said axis thereof. The plastic jacket 13 is not usually subject to axial lengthening or shortening as is the helically and convolutely wrapped strip 10, and as a result the end portion of the strip 10 either extends from or it retracts into the jacket 13 when the hose H is initially cut off. And, when the connector is applied as is clearly shown throughout the drawings, the cut end of the strip 10 projects from the cut end of the jacket 13.

The body B is provided for the coupled engagement sought for and for the passage therethrough of the electrical conductors that are passed through the hose H. As is illustrated, the body B is an open ended cylinder of tubular cross-section, having a cylindrical inner bore 20 to pass electrical conductors, a cylindrical exterior 21 to receive the hose H, and a mounting head 22 to couple with other fittings and the like. In carrying out the invention the cylindrical exterior 21 forms a barrel that fits into the interior of the helically and convolutely wound strip 10 of the hose H. The said hose convolutions establish a thread form exposed at the interior of the hose and the thread thus formed will vary in width, to decrease or increase as and when the hose is bent or turned.

The cylindrical exterior has two diametrically opposite lugs on its outer diameter acting as an interrupted thread. The lugs are helically pitched and are shaped and portioned to wedge into the internal thread of the metal hose H. In accordance with the invention, the thread is V-shaped and preferably of a buttress-type cross-section and each section of thread, or each lug, has an inclined circumferential face 28 to guide into the thread within the hose H. Essentially, the inclined face 28 is convolutely related to the cylindrical exterior of the barrel 21, and in practice is an arcuate face formed eccentrically to the central axis of the cylindrical barrel 21. The body B of the connector is revolved into the hose H until the cut-off end of the metal spiral 10 abuts against a radially and axially projecting shoulder 25 that occupies the corner between the exterior of the barrel 21 and a sealing face 26 that is disposed in a plane normal to the central axis of the fitting. The diameter of the shoulder 25 is no greater than and/or is substantially the same as the exterior diameter of the helically wound strip 10, and the axially disposed face of the shoulder 25 is parallel to and spaced from the first described sealing face 26. Thus, there is a stepped facement at the head 22, to provide for independent engagement of the strip 10 and of the seal ring R, thereby assuring both an electrical ground through the hose H and a water tight seal between the hose H and connector C.

In practice, the shoulder 25 opposes and stops the cut-off end of the strip 10 and permits the end 15 of the jacket 13 to seek its own axial position dependent upon the amount of axial expansion or contraction that may take place upon cutting of the hose and upon threading of the same onto the barrel 21. The helical angles of the two lugs 24 differ from each other and differ from that of strip 10 so as to establish friction by forcing the strip 10 to conform to the angle of the lugs, thereby bending the strip 10. In any case, the lugs 24 are widened, compared with the normal width of the thread existing in the metal hose H, so as to spread the adjacent strip convolutions a maximum, and thereby lengthening the metal hose and which forces the cut-off end into pressured engagement with the shoulder 25. However, the end 15 of jacket 13 remains free of the sealing face 26 in order to prevent any encroachment of the jacket onto said sealing face. Substantial friction is caused between the lugs 24 and the strip 10 with the revolvement of the connector into the hose H thereby increasing the diameter of the hose and thus reducing the said friction when installation is made, but which decreases the diameter of the hose when any attempt is made to revolve the connector out of the hose and thus increasing said friction. Therefore, the connection is self-locking while permitting ease of assembly.

The seal ring R is provided for constricting onto the exterior of the hose H to engage tightly onto the plastic jacket 13 and for pressing axially into tight engagement with the sealing face 26, both of these functions being independent of each other and independent of the anchored engagement of the body B with the strip 10. The seal ring R is adapted to both constrict its inner diameter and to extend axially and can be made in various ways. It is preferred that the ring R be made of a plastic material that is forceable so as to constrict radially inward, and so as to extend axially when external and endwise pressure is applied thereto. In its preferred form the ring R is constructed of a deformable ring 31 of nylon plastic so as to have both functions referred to above, namely that of constriction and also that of endwise extension. As shown, the face 30 of the seal ring is bevelled to engage with face 34, so that axial pressure applied by nut N constricts ring R and causes it to have pressured engagement on the jacket 13. Also, tightening of nut N forcibly moves the material of the deformable plastic seal ring R into pressured engagement with the sealing face 26 and causes it to occupy all interstices, as is indicated. The seal ring R is a continuous 360° part and thus establishes a fluid tight joint between the jacket 13 and sealing face 26, the only joint which would be subject to leakage.

The nut N is provided to engage and constrict and axially move the seal ring R and is characteristically a sleeve threadedly engaged over the head 22. The nut N, like the head 22, has a polygonal exterior 36 for engagement by means of tools and it is characterized by its inwardly disposed flange 32 with an opening 33 freely passing the major diameter of the hose H. The open or threaded end of the nut N is threaded onto the head 22 for axial movement while the flange 32 projects inwardly from the other end with a face 34 opposed to the sealing face 26. The face 34 is inclined to correspond with the inclination of the end face 30 with which it has cammed engagement, and it is this feature which affords an inward camming action in order to assuredly constrict the seal ring R while moving it axially.

The coupling end portion of the body B can be varied as circumstances require and is shown as a threaded section adapted to be engaged with another part, fitting and/or any desired equipment to be placed in communication with the interior of the hose H.

From the foregoing it will be apparent that grounding of strip 10 of the hose H is achieved through contact of the lugs 24 with the interior spiraled thread of the hose and by abutting the cut-off end of the metallic element of the hose against the shoulder 25 of the head 22. The locking feature, the bending of the strip 10, assures positive electrical contact of the lugs 24 with strip 10 and the engagement of said lugs which widens the thread in the hose assures that the cut-off end is axially extended and urged into stopped engagement with the shoulder 25. It is normal to cut off the hose H into sections by the use of a hacksaw or the like, in which case a smooth cut may not always result and in which case the jacket 13 may protrude somewhat beyond the extent of the strip 10. In this respect, the lugs 24 are of maximum amount, as shown, thereby extending the strip 10 axially, and the shoulder 25 stops the strip 10 so that in no case does the usual ragged end 15 of jacket 13 encroach onto the sealing face 26 to interfere with the flat engagement of seal ring R therewith. As a result, positive grounding and water tight sealing is established between the hose H and connector C.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A connector for strip-wound metal hose, said hose comprising continuous axially interlocking and limitedly spaced helical convolutions of metal, and said connector including, a tubular body of electrically conductive material with a passage therethrough to form a continuation of the hose and having a cylindrical portion with at least two axially spaced radially projecting lugs pitched at a helical angle differing from each other and from that of the hose convolutions; and each to threadedly engage between adjacently spaced convolutions of the hose thereby spreading adjacent convolutions at each lug and lengthening the hose for tightening the convolutions surrounding the cylindrical portion of said body, said lugs being helically disposed and of cross-section greater than the normal spacing between the adjacent hose convolutions so as to spread said adjacent hose convolutions axially, and a shoulder on said body and opposed to the end of the hose to be engaged by the endmost convolution thereof for effective electrical ground to the connector body.

2. The connector for strip-wound metal hose as set forth in claim 1 and wherein each of the at least two said lugs is radially inclined throughout its circumferential extent in the direction of rotation for tightening, thereby progressively entering between and spreading adjacent convolutions at each lug and lengthening the hose for tightening the convolutions surrounding the cylindrical portion of said body.

3. A connector for jacketed strip-wound metal hose, said hose comprising continuous axially interlocking and limitedly spaced helical convolutions of metal and a seamless non-metallic jacket fitting snugly about said convolutions and free therefrom, and said connector including, a tubular body of electrically conductive material with a passage therethrough to form a continuation of the hose and having a cylinder portion with at least two axially spaced radially projecting lugs and each to threadedly engage between adjacently spaced convolutions at the interior of the hose, said lugs being helically disposed and of cross-section greater than the normal spacing between adjacent hose convolutions so as to spread said adjacent hose convolutions axially and independently of the jacket free therefrom, a shoulder at the juncture of the cylinder portion and a sealing face disposed normal to and facing the end of said hose, said shoulder being limited in diameter to oppose the endmost hose convolution and free of the said jacket, and a seal ring carried over the hose surrounding the cylinder portion of the body, there being retainer means on the body and having a face opposed to the sealing face on the body and forceably pressing the seal ring onto the jacket of the hose and against the sealing face for leakproof sealing of the jacket with the connector body and with the endmost convolution engaging the said shoulder for effective electrical ground to the connector body.

4. The connector for jacketed strip-wound metal hose as set forth in claim 3 and wherein the face of the retaining means is movable axially to press the seal ring and is chambered to capture the seal ring for constriction onto the jacket while pressing the seal ring against the sealing face on the body.

5. The connector for jacketed strip-wound metal hose as set forth in claim 3 and wherein the at least two said lugs are pitched at a helical angle differing from that of the hose convolutions, thereby spreading adjacent convolutions at each lug and lengthening the same within the jacket of the hose for tightening the endmost convolution against the shoulder on said body with the said jacket withdrawn from the sealing face on the body.

6. The connector for jacketed strip-wound metal hose as set forth in claim 3 and wherein the at least two said lugs are circumferentially inclined in the direction of rotation for tightening, thereby progressively entering between and spreading adjacent convolutions at each lug and lengthening the same within the jacket of the hose for tightening the endmost convolutions with the said jacket withdrawn from the sealing face on the body.

7. The connector for jacketed strip-wound metal hose as set forth in claim 3 and wherein the at least two said lugs are of V-shaped cross-section and circumferentially inclined in the direction of rotation for tightening, thereby progressively entering and wedging between and spreading adjacent convolutions at each lug and lengthening the same within the jacket of the hose for tightening the endmost convolutions with said jacket withdrawn from the sealing face on the body.

References Cited
UNITED STATES PATENTS

| | | | |
|---|---|---|---|
| 848,819 | 4/1907 | Freeman | 174—83 X |
| 1,800,348 | 4/1931 | Hunter | 174—65 X |
| 1,933,769 | 11/1933 | Steele | 285—249 |
| 2,426,332 | 8/1947 | Acres | 285—161 X |
| 2,475,322 | 7/1949 | Horton et al. | 285—161 |
| 2,821,567 | 1/1958 | Bergan | 174—246 X |
| 2,918,314 | 12/1959 | Kemnitz | 174—149 X |

FOREIGN PATENTS 1,162,508   4/1958   France.

EDWARD C. ALLEN, *Primary Examiner.*

T. F. CALLAGHAN, *Examiner.*